Dec. 7, 1937. W. ZAK 2,101,356
ORIFICE DIAL VALVE
Filed April 19, 1937
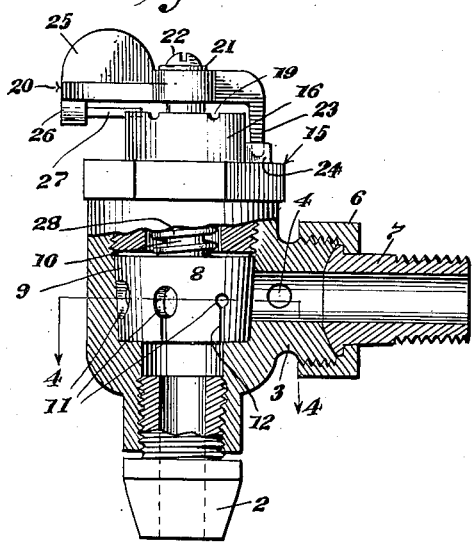
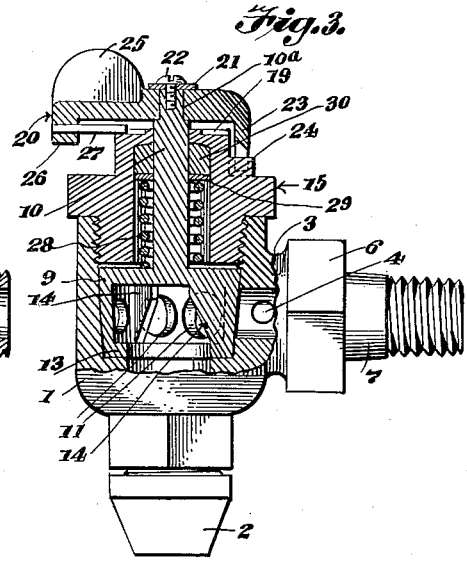
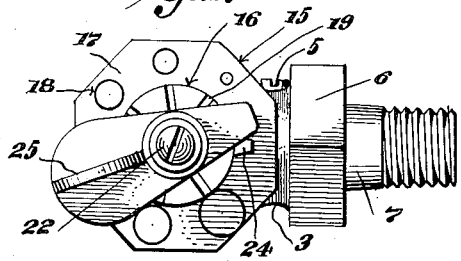
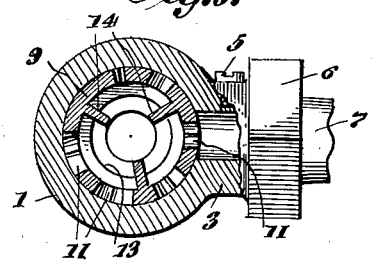
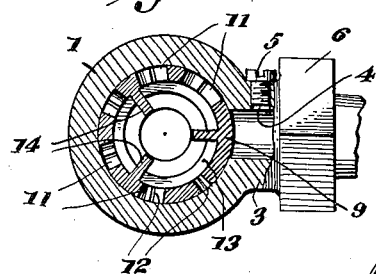
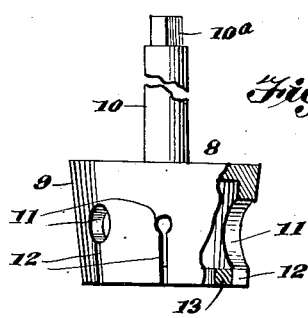
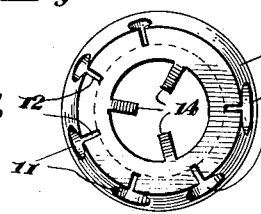
Inventor,
WILLIAM ZAK.

Patented Dec. 7, 1937

2,101,356

UNITED STATES PATENT OFFICE 2,101,356

ORIFICE DIAL VALVE

William Zak, San Francisco, Calif.

Application April 19, 1937, Serial No. 137,802

5 Claims. (Cl. 251—92)

This invention relates to an orifice dial valve.

An object of the invention is the construction of an efficient valve which will control the flow correctly in heating systems, just by turning the handle, whereby the size of the orifice will be changed, thereby regulating the flow desired in the heating system.

Another object of the invention is the improvement of the construction of an orifice head or valve plug in a valve device constructed in accordance with the present invention.

A further object of the invention is the improvement of the construction of the cap of the device and the handle cooperating with said cap, whereby the operator can accurately determine the flow through the valve device.

With the foregoing and other objects in view, my invention comprises certain novel constructions, combinations and arrangements of parts or units as will be hereinafter fully described, illustrated in the accompanying drawing and more particularly pointed out in the appended claims.

In the drawing:

Figure 1 is a view partly in elevation and partly in vertical section of a device constructed in accordance with the present invention, while Figure 2 is a top plan view of the same.

Figure 3 is partly an elevation and partly vertical central section of a device constructed in accordance with the present invention.

Figure 4 is a horizontal sectional view, taken on line 4—4, Figure 1, and looking in the direction of the arrows.

Figure 5 is a horizontal sectional view, similar to Figure 4, showing the valve plug open.

Figure 6 is a view partly in elevation and partly in vertical section of the orifice head or valve plug constructed in accordance with this invention, while Figure 7 is a bottom plan view of the same.

Referring to the drawing by numerals, 1 designates the casing which is provided on its bottom with a screw threaded plug 2, for slip tubing. Extending from one side of casing 2 is an extension 3 which is provided with a tapped opening 4 for draining purposes. This opening 4 is closed by screw plug 5. A coupling nut 6 is on extension 3, and this nut carries a hollow tail piece 7.

In casing 1 is an orifice head or valve plug 8 which comprises head 9 and stem 10. The head 9 is provided in its sides with orifices or apertures 11, varying in size, to control the flow through the valve device at the will of the operator. A slit slot 12 opens at its inner end upon an aperture 11 and at its outer end upon the bottom edge of the head 9; each orifice or aperture 11 is provided with a like slot 12. These slots 12 are provided for expansion. An annular inwardly-extending integral flange 13 is provided, which prevents warping of the head. In the head 9 are a series of integral vertically-extending side braces 14 extending inwardly from the inner wall of said head 9; the lower end of each brace 14 is about as wide as flange 13, but these braces increase in size towards the center of the head as shown in Fig. 3.

A cap 15 is provided, which is threaded into the top of casing 1. This cap 15 is provided with an upwardly-extending hollow head 16. The cap 15 is also provided on its top with a dial face 17 (Fig. 2) on which is formed a number of indicating circles 18; these circles correspond in number to the apertures 11. On the top of head 16 are a series of grooves 19; the grooves 19 radiate from the center of head 16, and there are as many grooves as indicating circles 18. In other words, the grooves 19 register at their outer ends with indicating circles 18.

A handle 20 is mounted upon the squared end 10a of stem 10, with a washer 21 resting on said handle, and a screw 22 serves to hold the handle securely on the stem. The handle is provided at one end with a depending finger 23, which finger is adapted to engage the upstanding-integral stop 24 formed on cap 15. The handle is provided on its outer end with an upstanding grip or flange 25, and beneath grip 25, the handle is provided with a depending lug 26. Extending through lug 26 (Fig. 3) is a spring locking pin 27. The inner end of pin 27 rides over the top of head 16, when rotary movement is imparted to the handle, and this pin 27 is adapted to rest in any one of grooves 19, thereby locking the handle and the valve plug in an adjusted position, against accidental displacement.

A coil spring 28 is within cap 15 and bears at its lower end upon the top of head 9 of the valve plug 8. A disc packing 29 is placed against the upper end of spring 28, and a separating washer 30 is against disc packing 29; the spring 28, packing 29 and washer 30 are slidably mounted upon stem 10. The spring 28 serves to keep valve head 9 snugly seated in its operative position in casing 1.

When the handle is in position shown in Fig. 2, with finger 23 against stop 24 then the valve device will be closed. By rotating the handle 20, pin 27 can be placed in any groove 19 desired, so that the flow through the valve device can be accurately controlled. If the minimum flow is desired the handle is moved to cause pin 27 to rest in the groove registering with the smallest indicating circle on the dial face, then the handle can be further rotated to cause pin 27 to move into the other grooves as a greater flow is desired.

In Figure 4 the valve plug is shown in a closed position. This figure also shows clearly the plug 5, which closes the cleanout or drain opening 4. In Figure 5 the valve plug is shown in an open condition, that is, with one of the apertures 11 registering with the hollow extension 3.

While I have described the preferred embodiment of my invention and illustrated the same in the acompanying drawing, certain minor changes or alterations may appear to one skilled in the art to which this invention relates during the extensive manufacture of same, and I, therefore, reserve the right to make such changes or alterations as shall fairly fall within the scope of the appended claims.

What I claim is:

1. In an orifice dial valve, the combination of a casing, a single-piece valve plug in said casing, said valve plug provided with an integral hollow head, said head provided in its bottom with an integral annular inwardly-extending flange, said valve head provided on its inner face with integral side braces extending inwardly from the inner wall of said valve head, said braces terminating at their bottoms in said annular flange, said hollow head provided with apertures and communicating slots in its sides, said apertures and slots being equal in number, said slots extending below said annular flange and to the bottom face of said hollow head, and means connected to said valve plug for manually operating same.

2. In an orifice dial valve, the combination of a casing, a single-piece valve plug in said casing, provided with a hollow head, said head provided at its bottom with an inwardly-extending flange and in its side with a series of combined apertures and slots, said slots being spanned by said inwardly-extending flange, said head provided therein with straight braces on its inner wall and said braces extending toward the middle of said head, and means connected to said valve plug for manually operating same.

3. In an orifice dial valve, the combination of a casing, a valve plug in said casing, said valve plug provided with a hollow head having an inwardly-extending flange at its outer end, said head and flange being provided on their inner faces with inwardly-extending straight braces, said braces increasing from the flange to their inner ends in size, said head provided in its side with apertures, and means connected to said valve plug for manually operating same.

4. In an orifice dial valve, the combination of a casing, a valve plug in said casing, said valve plug provided with a hollow head, said hollow head including a side wall and a flange extending inwardly from the bottom edge of said side wall, vertical braces entirely within said hollow head and connected at their inner edges only to the inner face of said side wall and flange, said head provided with apertures in said side wall between said braces, and means connected to said valve plug for manually operating same.

5. In an orifice dial valve, the combination of a casing, a valve plug in said casing, said valve plug provided with a hollow head, said hollow head including the side wall and a flange extending inwardly from the bottom edge of said side wall, vertical straight braces extending from their inner ends or edges outwardly throughout their entire height toward the middle of said hollow head, each of said braces increasing in width from said flange to its uper end against the top of said hollow head, said head provided in its side wall with apertures between the portions thereof having said braces, and means connected to said valve plug for manually operating same.

WILLIAM ZAK.